United States Patent
Hata et al.

(10) Patent No.: US 8,774,002 B2
(45) Date of Patent: Jul. 8, 2014

(54) TRAFFIC CONTROL APPARATUS AND DATA COMMUNICATION SYSTEM INCLUDING SAME

(75) Inventors: Yoichi Hata, Yokohama (JP); Yasuhito Fujita, Yokohama (JP); Yoshimitsu Goto, Yokohama (JP); Toshiaki Kakii, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 129 days.

(21) Appl. No.: 13/384,924

(22) PCT Filed: Jul. 21, 2010

(86) PCT No.: PCT/JP2010/062226
§ 371 (c)(1),
(2), (4) Date: Feb. 21, 2012

(87) PCT Pub. No.: WO2011/010657
PCT Pub. Date: Jan. 27, 2011

(65) Prior Publication Data
US 2012/0134270 A1    May 31, 2012

(30) Foreign Application Priority Data
Jul. 22, 2009    (JP) ................ P2009-171396

(51) Int. Cl.
G01R 31/08 (2006.01)
H04L 12/28 (2006.01)
H04L 12/56 (2006.01)
H04L 5/00 (2006.01)
H04L 12/26 (2006.01)

(52) U.S. Cl.
CPC ............ *H04L 5/003* (2013.01); *H04L 12/2861* (2013.01); *H04L 12/2607* (2013.01)
USPC ........... 370/235; 370/252; 370/254; 370/401; 709/223; 709/238; 709/249

(58) Field of Classification Search
CPC ......... H04L 5/003; H04L 12/46; H04L 12/00; H04L 12/66; H04L 12/2602; H04L 12/20607; H04L 12/2634; H04L 12/2861; H04L 12/5689; H04L 41/04; H04L 41/12; H04L 43/08; H04L 43/50; H04L 43/0852; H04L 45/00; H04L 45/02; H04L 45/04; H04L 47/10; H04L 47/35; H04L 47/30; H04L 47/32; H04L 63/06; H04L 2012/46; H04L 2012/5618; H04B 17/003; H04W 24/00
USPC .......... 370/235, 252, 254, 401; 709/223, 238, 709/249
See application file for complete search history.

(56) References Cited

U.S. PATENT DOCUMENTS

| | | | |
|---|---|---|---|
| 2006/0159088 A1* | 7/2006 | Aghvami et al. | 370/389 |
| 2009/0013210 A1* | 1/2009 | McIntosh et al. | 714/4 |
| 2010/0067533 A1* | 3/2010 | Yoshida et al. | 370/401 |

FOREIGN PATENT DOCUMENTS

| | | |
|---|---|---|
| CN | 1713606 | 12/2005 |
| JP | 11-161571 | 6/1999 |
| JP | 2007-251660 | 9/2007 |
| WO | 2009/028185 | 3/2009 |
| WO | WO 2009028185 A1 * | 3/2009 |

OTHER PUBLICATIONS

Teruki Sukenari et al., "Available Bandwidth Estimation Considering Real-Time Property based on End-to-End Packet Transmission Model", Multimedia, Distributed, Cooperative, and Mobile Symposium (DICOMO2007), Jul. 4, 2007, p. 939-945 including English translation.

* cited by examiner

*Primary Examiner* — Alpus H Hsu
*Assistant Examiner* — Dharmesh Patel
(74) *Attorney, Agent, or Firm* — Drinker Biddle & Reath LLP

(57) ABSTRACT

The present invention relates to a traffic control apparatus and the like for optimizing a communication performance of each of local networks to be monitored. The traffic control apparatus (100) temporarily stores in the memory (120) communication band information items of relay nodes (211B, 212B, 213B) through the I/O (140). The controller (110) specifies a bottleneck relay node based on the obtained communication band information items, calculates transmittable/receivable bands to be allocated to the PCs (220B), and notifies the PCs (220B) of the calculated transmittable/receivable bands. In response to this notification, the PCs (220B) divide data to be transmitted, with the divided data corresponding to the allocated bands, and transmit the divided data to the Internet (10), in a manner that the divided data are arranged temporally evenly.

8 Claims, 11 Drawing Sheets

*Fig.4*

(STATIC MANAGEMENT TABLE)                                    122A(122)

| LOCAL NETWORK | RELAY NODE | | | RELEVANT PC | CONNECTION STATUS |
|---|---|---|---|---|---|
| | LAYER 1 | LAYER 2 | ... | | |
| A | A1 | — | — | PC1 | * |
| | | A1-1 | — | PC1 | — |
| | | | — | PC2 | * |
| | | | — | PC3 | — |
| | | | — | PC4 | — |
| | | A1-2 | — | PC1 | * |
| | | | — | PC2 | * |
| | | | — | PC3 | — |
| | | | — | PC4 | — |
| B | | | ⋮ | | |

*Fig.11*

(DYNAMIC MANAGEMENT TABLE)     122B(122)

| COMMUNICATION | REFERENCE PC | RELEVANT INFORMATION (LOCAL NETWORK) |
|---|---|---|
| C1 | PC1 | A |
|    | PC2 | B |
| C2 | PC1 | A |
|    | PC2 | B |
|    | PC3 | C |
|    | PC4 | A |
| ⋮ | ⋮ | |

TRAFFIC CONTROL APPARATUS AND DATA COMMUNICATION SYSTEM INCLUDING SAME

TECHNICAL FIELD

The present invention relates to a traffic control apparatus for optimizing a communication performance of each local network to be monitored, out of local networks that are connected to a data communication network such as the Internet for enabling data communications between computers. The present invention also relates to a data communication system that includes this traffic control apparatus.

BACKGROUND ART

FIG. 1 is a view for explaining a general network configuration that enables two-way data communications among specific information terminals (to be simply referred to as "PC" hereinafter). As shown in FIG. 1, a plurality of local networks 20A, 20B are connected to a data communication network such as the Internet 10 by representative nodes 21A, 21B. The data communication network means a computer network that is configured by a plurality of types of wired/wireless transmission media. The local networks 20A, 20B are closed networks capable of communicating data with nodes in a previously permitted range, in which in general each of the PCs can transmit/receive the data to/from the data communication network outside the local networks only through at least one predetermined node. For instance, out of networks each having a node group configured by a plurality of multi-hierarchical routers, a network in which one of the routers functions as a representative node is included in the local networks 20A, 20B.

The above-described network configuration in which the plurality of local networks 20A, 20B are connected to the Internet 10 is widely used as a configuration for constructing an intranet that can be connected to the Internet, or, for example, a TV conference system that communicates data with business facilities with a company.

Here, the local network 20A is configured by the representative node 21A serving as a highest relay node, and a plurality of PCs 221A to 224A disposed in lower layers of the representative node 21A. The local network 20B, too, is configured by the representative node 21B serving as a highest relay node and a plurality of PCs 221B to 224B disposed in lower layers of the representative node 21B. In both of the local networks 20A, 20B, the PCs 221A to 224A and 221B to 224B communicate data with the Internet 10 non-synchronously via the representative nodes 21A, 21B.

However, in recent years, data exchange in a TV conference and the like using an inexpensive Internet has become popular, as well as transmission/reception of a large volume of data among an unspecified number of PCs. When such a situation becomes normal, the network configuration shown in FIG. 1 where the direct access of the PCs 221A to 224A and 221B to 224B of the local networks 20A, 20B an external network is limited, most of the communication bands of the representative nodes 21A, 21B is often occupied by some of the PCs that communicate data. In such a case, the representative nodes 21A, 21B inevitably become bottlenecks, lowering the communication performances in the local networks 20A, 20B. Moreover, in the current situation, the communication qualities significantly fluctuate geographically and temporally due to fluctuations in the performances of network resources. For this reason, it is urgent that the network resources be utilized effectively and that the communication performances be improved.

For example, Patent Document 1 discloses a technology for improving the communication performance of the entire wireless communication system by enabling a simultaneous connection between a wireless base station and a number of terminals while maintaining a constant communication quality in a wireless line where a transmission rate change momentarily. Patent Document 2, on the other hand, discloses a technology for optimizing the communication quality of a communication system while maintaining the communication performance thereof by adjusting the image quality of transmittable/receivable data in accordance with a terminal performance/line quality.

CITATION LIST

Patent Document

Patent Document 1: Japanese Patent Application Laid-Open No. 2007-251660
Patent Document 2: Japanese Patent Application Laid-Open No. H11-161571

SUMMARY OF THE INVENTION

Technical Problem

The inventors of the present invention have discovered the following problems after reviewing the conventional communication systems and the like.

In other words, the technology disclosed in Patent Document 1 estimates a free capacity of traffic in the wireless base station and authorizes/refuses a connection of the wireless base station to the communication terminal on the basis of the estimated information. However, the technology described in Patent Document 2 has to allow the coexistence of the communication terminals that can receive a communication service and the communication terminals that wish to receive the communication service but cannot receive the communication service, causing an extreme difference in service level between the communication terminals.

The technology described in Patent Document 2, on the other hand, intentionally adjusts the communication quality in accordance with the resource performances such as the line quality and the like. The technology of Patent Document 2, therefore, still causes the problem about the extreme difference between the communication services received by the communication terminals, depending on the geographical or temporal conditions.

The present invention was contrived in view of the problems described above, and an object thereof is to provide a traffic control apparatus that has a structure for optimizing a communication performance of each local network to be monitored, out of a plurality of local networks that are connected to a data communication network such as the Internet, and to provide a data communication system that includes this traffic control apparatus.

Solution to Problem

A traffic control apparatus according to the present invention can be applied to a data communication system that enables two-way data communications among specific PCs. This data communication system includes, as network resources, a data communication network such as the Internet, and one or more local networks, each of which is configured by a plurality of PCs and connected to the data communication network by a representative node. Note that examples of the network resources include not only data line itself but also PCs, nodes, network control apparatuses, and other network management means. The traffic control apparatus according to the present invention is applied to the data communication system described above, and optimizes a communication performance of a local network set as a monitoring target local network, which configures part of the network resources in the data communication system. The traffic control apparatus according to the present invention dynamically avoids a situation where the throughput of only some of the PCs drops significantly due to an increased communication load within the local network set as a monitoring target local network.

In the network configuration described above, particularly the traffic control apparatus according to the present invention is arranged in a manner as to be connected to the data communication network or to configure a part of the local network, and has at least input/output means, recording means, and control means. The input/output means transmits/receives data to/from one or more relay nodes that are arranged in an area between the plurality of PCs and the representative node and include the representative node. The recording means temporarily stores a communication band information item of each relay node as a traffic information item of each relay node. The control means allocates a data transmittable/receivable band of each PC based on the communication band information item stored in the recording means. More specifically, the control means specifies a bottleneck relay node out of the one or more relay nodes from each of which the communication band information item is collected, calculates the data transmittable/receivable bands to be respectively allocated to the PCs belonging to the local network set as a monitoring target local network, in a manner that a total value of the data transmittable/receivable bands does not to exceed a communication band of the specified relay node, and then notifies, through the input/output means, each of the PCs of the calculated data transmittable/receivable bands.

The traffic control apparatus according to the present invention can be applied to a network configuration that is configured by a data communication network such as the Internet, and a plurality of local networks, each of which is configured by a plurality of PCs and connected to a data communication network outside the abovementioned network by a representative node. In this case, the traffic control apparatus may monitor the plurality of local networks, to each of which two or more PCs performing two-way data communication are connected. Note that the local networks set as a monitoring target local network can be reset. In other words, the plurality of local networks may be monitored simultaneously, or another local network may be added to the local networks to be monitored. Furthermore, in such a second network configuration, the traffic control apparatus are arranged in a manner as to be connected to the data communication network or to configure a part of any of the plurality of local networks. The communication performance of each of the local networks connected to the data communication network can be optimized by allowing the traffic control apparatus to optimize the communication performance of the local networks set as monitoring target local networks, each time the local networks as monitoring target local networks are set (including resetting timing).

In the network configuration described above, the traffic control apparatus has at least input/output means, recording means, and control means. The input/output means transmits/receives data to/from one or more relay nodes that are arranged in an area between the plurality of PCs and the representative node and include the representative node, in each of the plurality of local networks set as monitoring target local networks. The recording means temporarily stores a communication band information item of each relay node as a traffic information item of each relay node in each of the plurality of local networks set as monitoring target local networks, the communication band information item being acquired through the input/output means. The control means specifies a local network as an optimization target local network, which includes a bottleneck relay node out of the one or more relay nodes from each of which the communication band information item is collected, on the basis of the communication band information item acquired in the recording means. The control means also calculates the data transmittable/receivable bands to be respectively allocated to the plurality of PCs belonging to the local networks set as optimization target local networks, in a manner that a total value of the data transmittable/receivable bands does not to exceed a communication band of the relay node of a local network, and then notifies, through the input/output means, each of the plurality of PCs belonging to the local network set as an optimization target local network, of the calculated data transmittable/receivable band.

In the traffic control apparatus according to the present invention, a static management table for understanding a logical network configuration for each of the local networks set as monitoring target local networks is stored in the recording means. Note that at least an address information item of each relay node, an address information item of each of the PCs belonging to the local networks, and a connection status of each PC are recorded in this static management table. A dynamic management table for specifying the local networks set as monitoring target local networks may be stored for each two-way data communication in the recording means. An address information item of each PC executing two-way data communication and an information item of each local network to which the PCs belong, are recorded for each two-way data communication in the dynamic management table.

Advantageous Effect of the Invention

In accordance with the present invention, the local networks that are connected to an external network such as the Internet by the representative node are taken as the local networks to be monitored, and the bottleneck relay node is specified in the local networks. In so doing, based on the communication band of the bottleneck relay node, each of the PCs disposed in lower layers of the representative node is notified of an available band for transmitting/receiving data. On the other hand, each PC executes data transmission/reception within the notified available range. This configuration can avoid a situation where the communication bands are occupied by some of the PCs that communicate data, and each of the PCs can transmit/receive data within the communication band allocated thereto, without being affected by the communication statuses of the other PCs. As a result, the communication performances of the whole local networks can be optimized.

BRIEF DESCRIPTION OF DRAWINGS

FIG. 4 is a view for explaining an example of a static management table;

FIG. 11 is a view for explaining an example of a dynamic management table.

DESCRIPTION OF EMBODIMENTS

Figure 1:
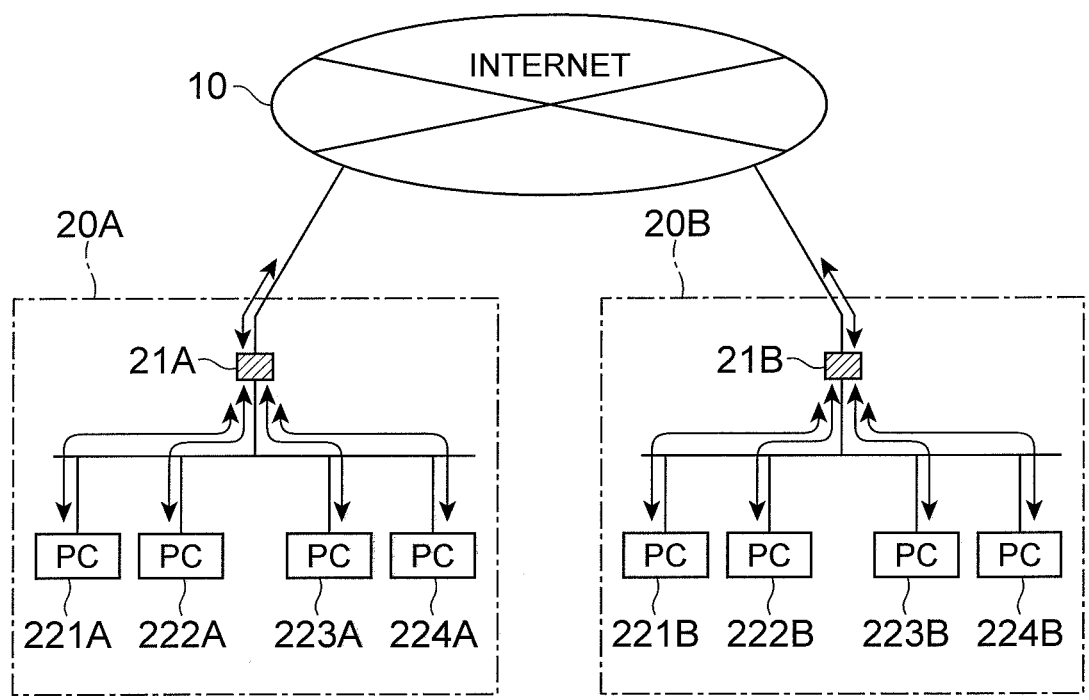
FIG. 1 is a view for explaining a general network configuration that enables two-way data communications among specified PCs.

In the following, embodiments of the traffic control apparatus according to the present invention are described in detail with reference to FIGS. 2 to 11. Note that the same reference numerals are used for describing the same elements shown in the views, and, therefore, the explanations thereof are omitted.

Figure 2:
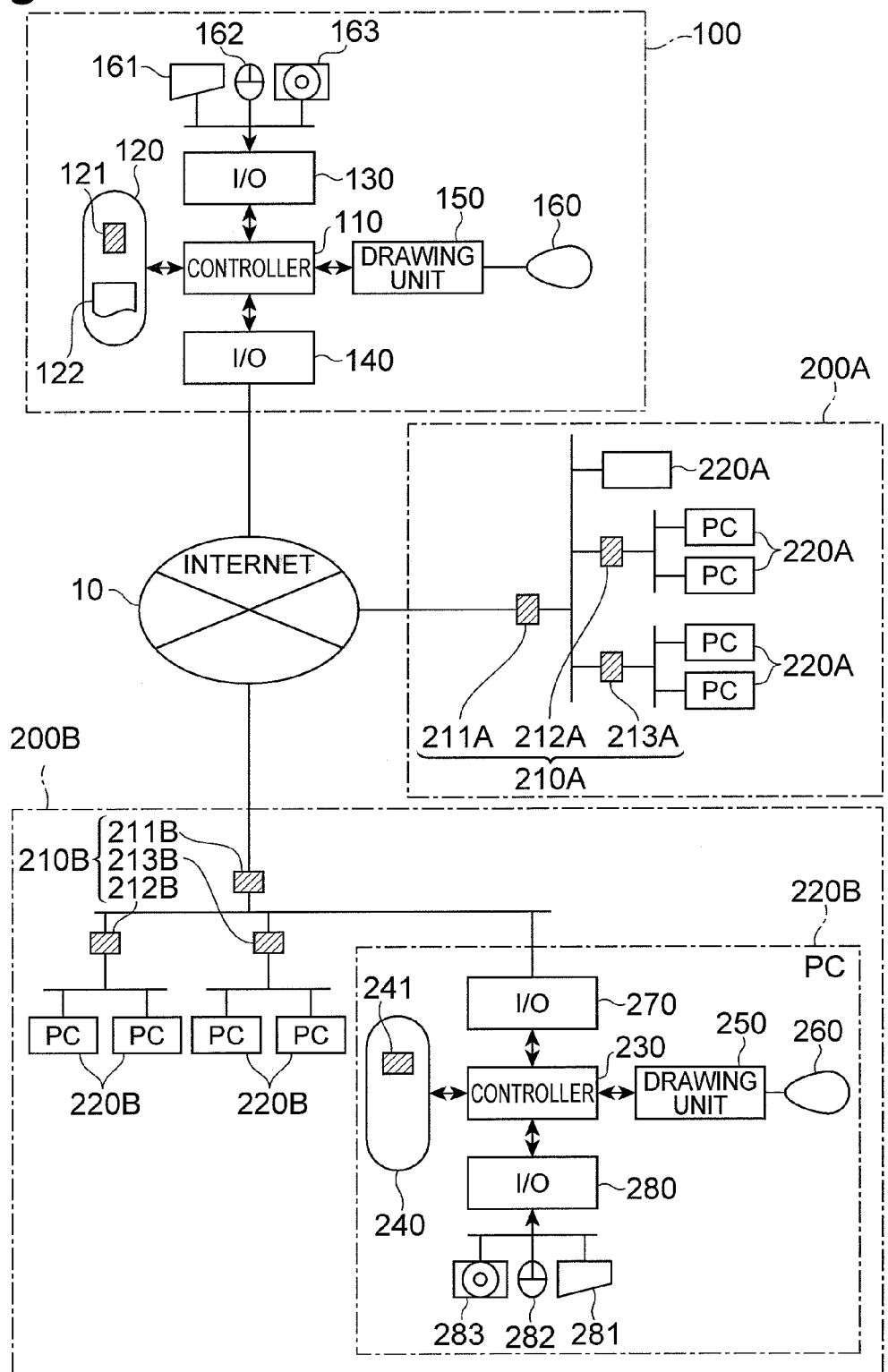
FIG. 2 is a view for explaining a network configuration (an embodiment of a data communication system according to the present invention) that enables two-way data communication, to which an embodiment of a traffic control apparatus according to the present invention is applied.

First, FIG. 2 is a view for explaining a network configuration (an embodiment of a data communication system according to the present invention) that enables two-way data communication, to which an embodiment of a traffic control apparatus according to the present invention is applied. In the network configuration shown in FIG. 2, a plurality of local networks 200A, 200B are connected to the Internet 10 by representative nodes 211A, 211B respectively. A traffic control apparatus 100 according to the present embodiment is also connected to the Internet 10. Note that the traffic control apparatus 100 may be any of the components configuring the local networks 200A, 200B (e.g., a relay node, a PC, etc.).

The local network 200A is configured by a relay node group 210A (including a plurality of relay nodes 211A, 212A, 213A) and a plurality of PCs 220A disposed in lower layers of the relay node group 210A. The representative node 211A functions as a highest relay node for connecting the local network 200A to the Internet 10. Therefore, the local network 200A is configured in a manner that each of the PCs 220A belonging to the local network 200A can be connected to the Internet 10 only by the representative node 211A.

The local network 200B also is configured by a relay node group 210B (including a plurality of relay nodes 211B, 212B, 213B) and a plurality of PCs 220B disposed in lower layers of the relay node group 210B. The representative node 211B functions as a highest relay node for connecting the local network 200B to the Internet 10. Therefore, the local network 200B is configured in a manner that each of the PCs 220B belonging to the local network 200B can be connected to the Internet 10 only by the representative node 211B.

Each of the PCs 220B belonging to the local network 200B has input/output means 270 functioning as a communication interface (referred to as "I/O" hereinafter), a controller 230, a memory 240 functioning as recording means, a rendering unit 250, a monitor 260, and an I/O 280 functioning as an interface for a keyboard 281, a pointing device (a mouse) 282 and an external recording device 283. Note that the memory 240 stores therein a two-way data communication application 241 for enabling two-way data communications among the other PCs (not only the PCs within the local network 200B but also the PCs belonging to the local network 200A), an information item of an available band (available band information item), and the like. The controller 230 functions as control means for executing the two-way data communication application 241.

Furthermore, the traffic control apparatus 100 connected to the Internet 10 also has I/O 130, 140 functioning as the input/output means, a controller 110 functioning as the control means, a memory 120 functioning as the recording means, a rendering unit 150, and a monitor 160. The I/O 130 functions as an interface for a keyboard 161, a pointing device 162 and an external recording device 163. The I/O 140 functions as an interface for enabling data communications between the traffic control apparatus 100 and the Internet 10. The memory 120 stores therein a traffic control application 121 for executing a communication performance optimization operation in the traffic control apparatus 100, and a management table 122.

Figure 3:
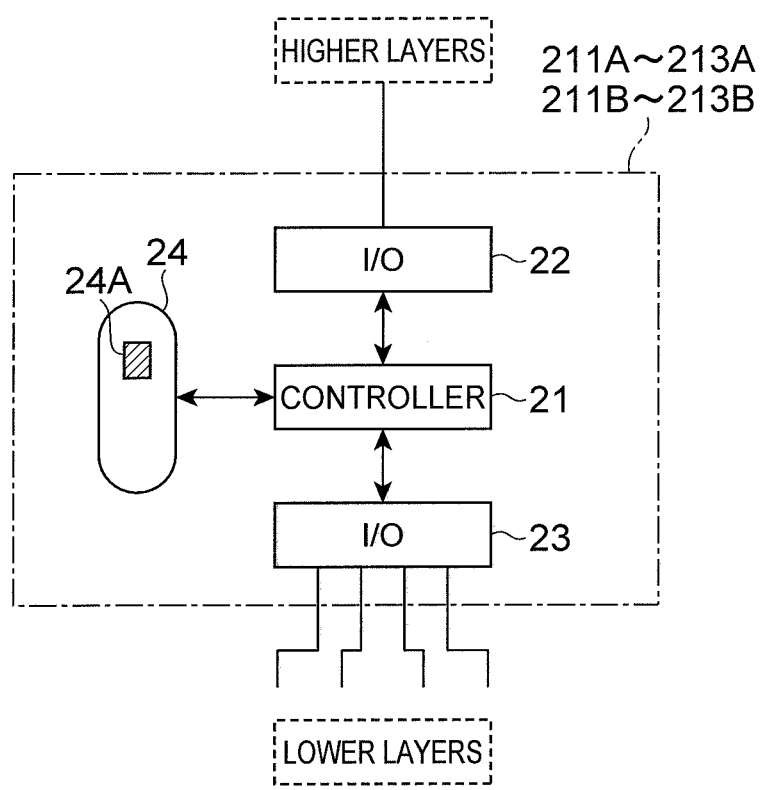
FIG. 3 is a view showing a configuration of a relay node.

Each of the relay nodes 211A to 213A and 211B to 213B has a structure shown in FIG. 3. In other words, each of the relay nodes has an I/O 22 functioning as a connection interface connected to a higher layer, an I/O 23 functioning as a connection interface connected to lower layers, a controller 21 for controlling data exchange between the I/O 22 and the I/O 23, and a memory 24. A communication band monitoring application 24A is stored in the memory 24. The controller 21 executes this communication band monitoring application 24A.

In addition, as the management table 122 stored in the memory 120 of the traffic control apparatus 100, for example, a static management table 122A for understanding a logical network configuration for each of the local networks to be monitored is stored. Note that as shown in FIG. 4 at least an address information item of each relay node, an address information item of each PC belonging to each local network, and a connection status of each PC are recorded in this static management table 122A. Also, each of the PCs 220A belonging to the local network 200A also has the same structure as each of the PCs 220B.

Figure 5:
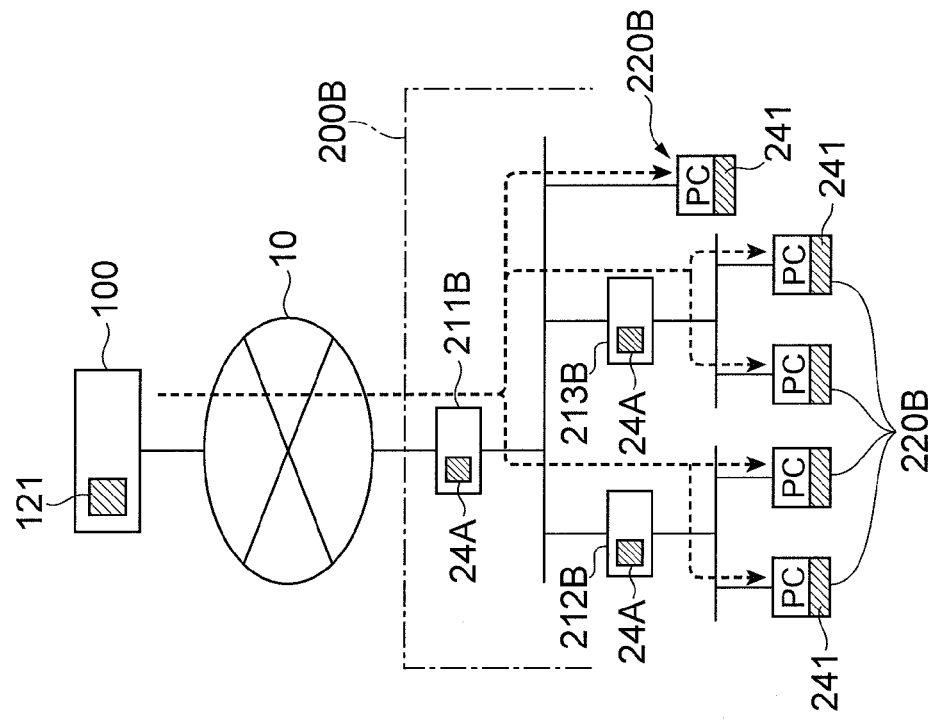
FIG. 5 is a view for explaining a communication performance optimization operation for a local network to be monitored, which is performed in the network configuration to which the traffic control apparatus according to the present embodiment is applied.
Figure 5:
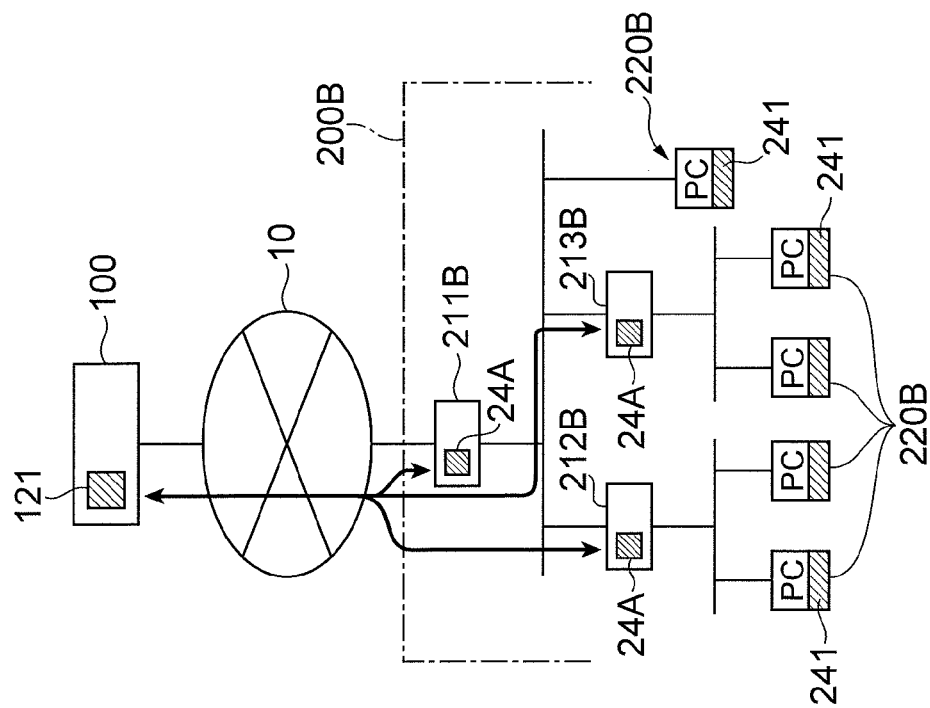
Figure 6:
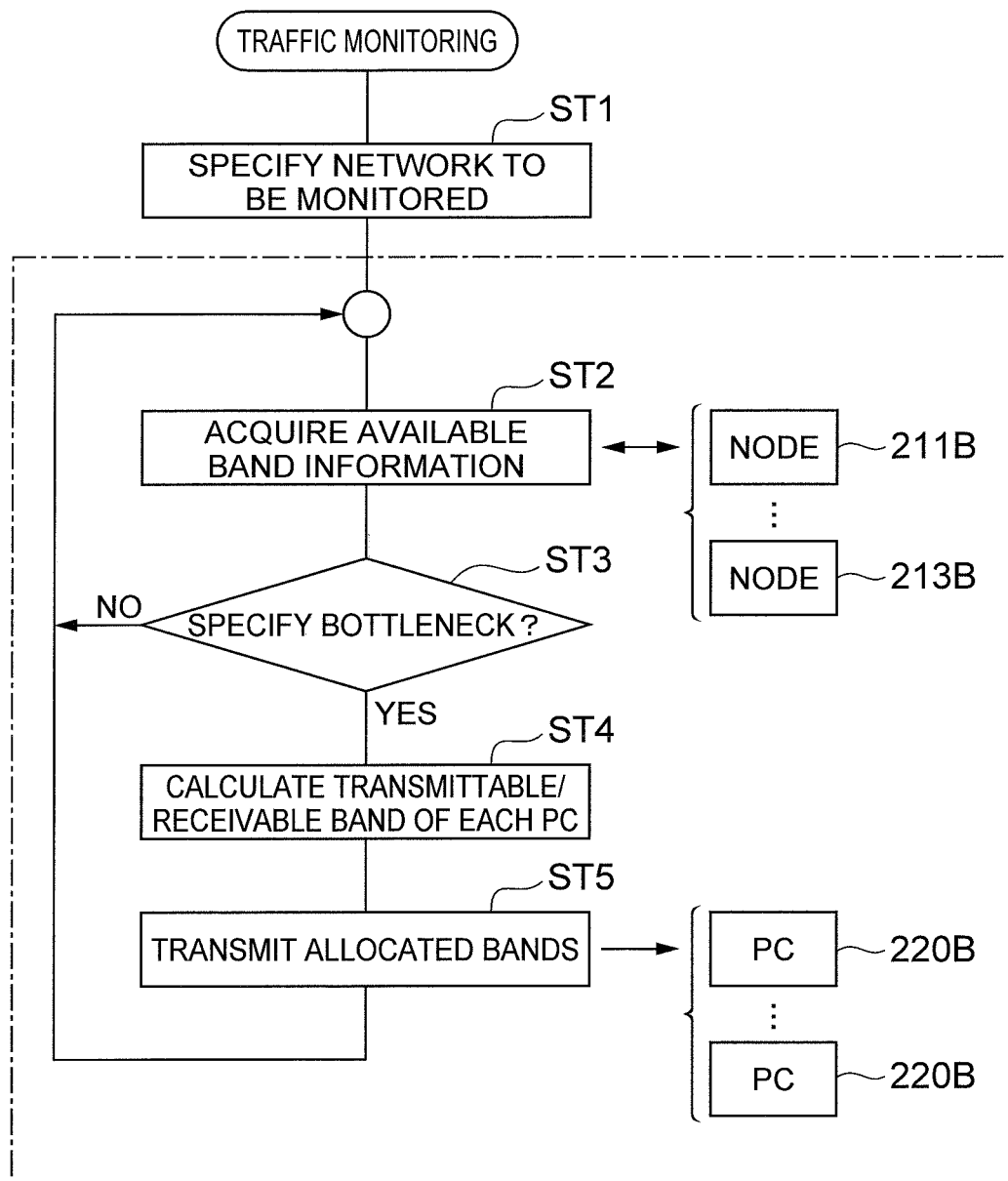
FIG. 6 is a flowchart for explaining the communication performance optimization operation performed by the traffic control apparatus according to the present embodiment.
Figure 7:
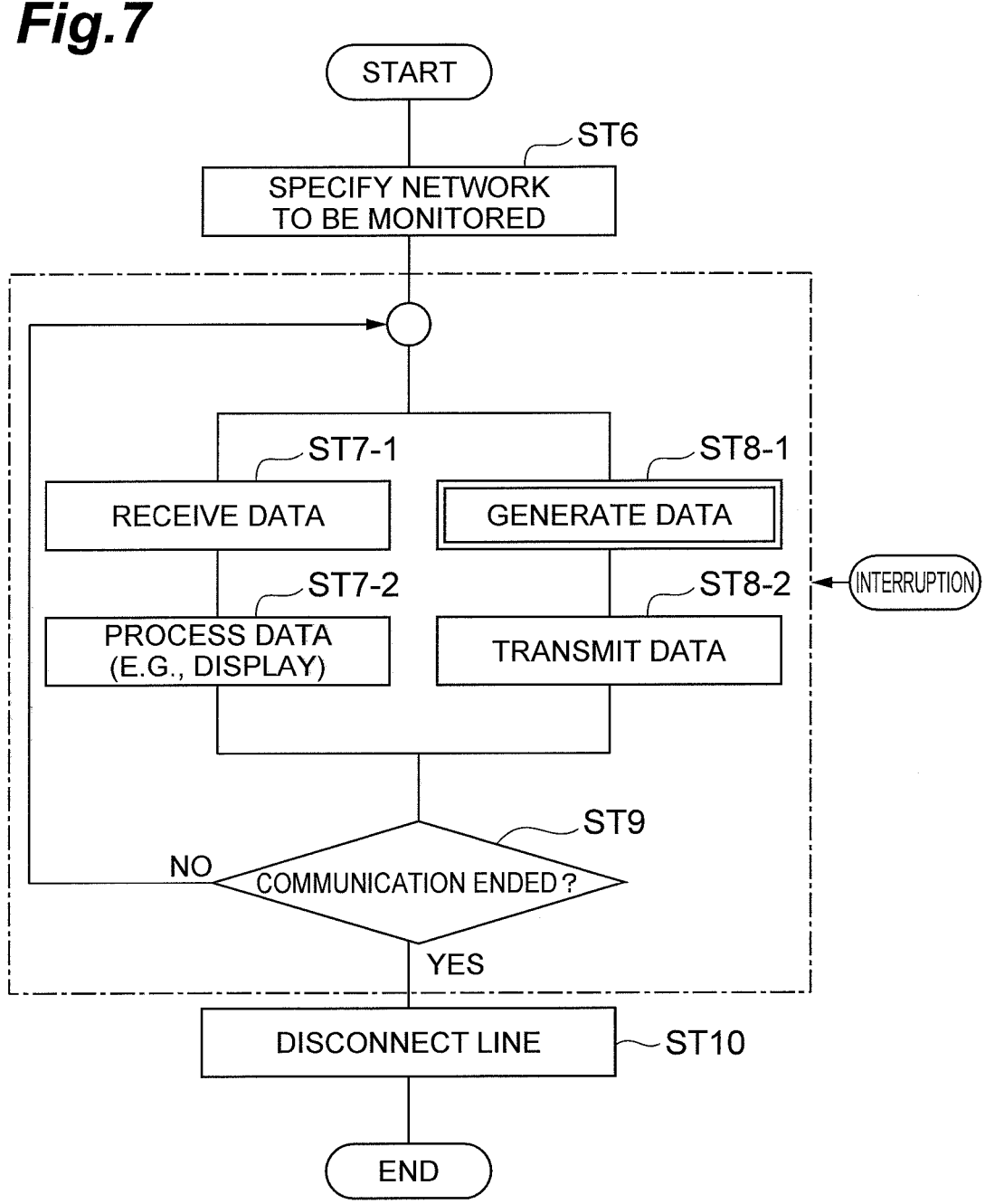
FIG. 7 is a flowchart for explaining a data transmission/reception operation performed in each information terminal (PC) belonging to the local network to be monitored.

Next, the communication performance optimization operation according to the embodiment of the present invention is described in detail with reference to FIGS. 5 to 7. FIG. 5 is a view for explaining the communication performance optimization operation for the local network 200B to be monitored, which is performed in the network configuration to which the traffic control apparatus 100 according to the present embodiment is applied. Particularly, in FIG. 5, the area (a) shows a view for explaining a bottleneck relay node specifying operation performed by the traffic control apparatus 100, and the area (b) a view for explaining an allocation operation for allocating data transmission/reception available bands to the PCs 220B, the allocation operation being performed by the traffic control apparatus 100. Moreover, FIG. 6 is a flowchart for explaining the communication performance optimization operation performed by the traffic control apparatus according to the present embodiment. The flowchart corresponds to the operations shown in the areas (a) and (b) of FIG. 5. In addition, FIG. 7 is a flowchart for explaining a data transmission/reception operation performed in each of the PCs belonging to the local network to be monitored.

In the following description, the traffic control apparatus 100 optimizes the communication performance of the local network 200B to be monitored, which is connected to the Internet 10 by the representative node 211B. As shown in FIG. 5, the traffic control application 121 is executed in the traffic control apparatus 100, and the communication band monitoring application 24A is executed in the relay nodes 211B to 213B. Furthermore, each of the PCs 220B is installed with the two-way data communication application 241 that uses the traffic control application 121 executed by the traffic control apparatus 100 to understand the operation status of each PC. The traffic control apparatus 100 and each of the PCs 220B have the structures shown in FIG. 2. The communication band monitoring application 24A may be executed by equipment other than the equipment configuring the relay nodes.

First, as shown in the area (a) of FIG. 5 and FIG. 6, the traffic control apparatus 100 specifies the local network 200B as the network to be monitored (step ST1). The traffic control apparatus 100 sequentially acquires a communication band information item from each of the relay nodes 211B to 213B of the local network 200B as a traffic information item (step ST2). Note that the communication band information item of each of the relay nodes 211B to 213B may be acquired via the input/output means (I/O) of each relay node or from a server or the like having a band management information item. The acquired traffic information items are sequentially stored in the memory 120 of the traffic control apparatus 100. This acquisition operation is repeated until a bottleneck relay node is specified, the bottleneck relay node being a relay node that causes lowering of the communication performance of the entire local network 200B (step ST3). More specifically, as a result of comparing the communication band information items of the relay nodes stored in the memory 120, a relay node with the narrowest band is specified as the bottleneck relay node.

Once the bottleneck relay node is specified, the traffic control apparatus 100 allocates the available bands that can be used for transmitting/receiving data of operating PCs to the operating PCs (the PCs executing the two-way data communication application 241, referred to as "operating PCs") out of the PCs 220B belonging to the local network 200B to be monitored. More specifically, as shown in the area (b) of FIG. 5 and FIG. 6, the controller 110 calculates the available bands (data transmittable/receivable bands) to be notified to the operating PCs, based on the number of operating PCs and the communication band of the bottleneck relay node (the traffic information items stored in the memory 120) (step ST4). At this moment, a total value of the available bands to be notified to the operating PCs is set so as not to exceed the communication band of the bottleneck relay node. Then, information items on the calculated available bands are transmitted to each of the operating PCs out of the PCs 220B belonging to the local network 200B via the I/O 140 (step ST5).

As shown in FIG. 7, on the other hand, once the operating PCs are connected to counter PCs via the relay nodes 211B to 213B and the Internet 10 (step ST6), two-way data communication is executed between the operating PCs and the counter PCs via the I/O 270. This two-way data communication is performed when the controller 230 executes the two-way data communication application 241 stored in the memory 240. More specifically, an operation for receiving digital data (sound, images, etc.) from the counter PCs and an operation for transmitting the digital data to the counter PCs are performed concurrently. In other words, in the operation where the operating PCs receive the digital data, once the digital data are received from the counter PCs (step ST7-1), the received data are displayed on the monitor or subjected to other process according to need (step ST7-2). On the other hand, in the operation where the digital data are transmitted by the operating PCs, the digital data to be transmitted to the counter PCs are generated (step ST8-1), and the generated data are transmitted sequentially to the counter PCs (step ST8-2). These transmission/reception operations are continuously performed until the two-way data communication (communication) between the operating PCs and the counter PCs is ended (step ST9). The connection (line) between the operating PCs and the counter PCs is disconnected once the communication is ended (step ST10).

Figure 8:
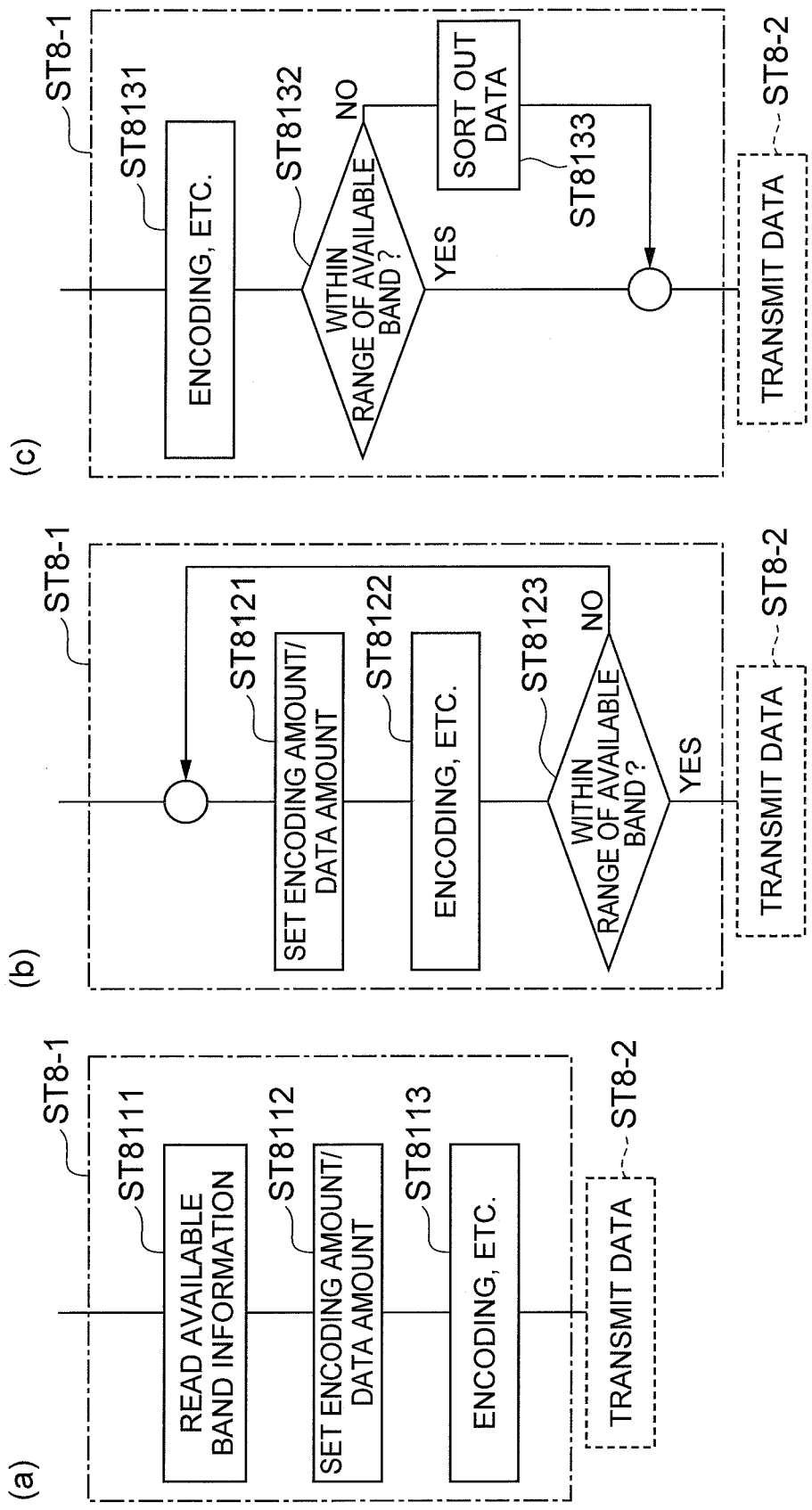
FIG. 8 is a flowchart for explaining a specific example of a data generation operation.

Note that the above has described an example in which the present embodiment is applied to two-way data communication, but the present embodiment can be applied similarly to one-way data communication in which the operating PCs perform only the transmission operation and the counter PCs perform only the reception operation. As shown in FIG. 8, various modifications can be performed on the digital data generation operation in step ST8-1.

For instance, in a first operation example of the data generation operation (step ST8-1) in the operating PCs as shown in the area (a) of FIG. 8, first, the available band information items (a default value, a value obtained in a previous operation, a value obtained as a result of a conversion in an interruption process described hereinafter, etc.) that are stored previously in the memory 240 are read (step ST8111), and an encoding amount or data amount that can be transmitted are calculated based on the read available band information items (step ST8112). Thereafter, compressed data and the like corresponding to the encoding amount or the data amount that are calculated in step ST8112 are generated (step ST8113). The digital data obtained in these steps ST8111 to ST8113 are transmitted to the counter PCs (step ST8-2).

In a second operation example of the data generation operation (step ST8-1) in the operating PCs as shown in the area (b) of FIG. 8, the encoding amount or the data amount are set prior to generating the digital data to be transmitted from the operating PCs to the counter PCs (step ST8121). Thereafter, compressed data and the like corresponding to the encoding amount or the data amount that are set in step ST8121 are generated (step ST8122). Once the digital data to be transmitted are generated, it is determined whether or not the data amount or the like of the digital data fall within the range of the available band information items read from the memory 240 (step ST8123). When it is determined in this step ST8123 that the data amount or the like of the generated digital data do not fall within the range of the read available band information items, steps ST8121 to ST8122 are executed again. Note that when resetting the encoding amount or the data amount in step ST8121, the data compression rate is increased as a result of decreased bit rate or frame rate during compression, or some data are eliminated. However, when it is determined that the data amount or the like of the generated digital data fall within the range of the read available band information items, the digital data obtained in steps ST8121 to ST8122 are transmitted to the counter PCs (step ST8-2).

Furthermore, in a third operation example of the data generation operation (step ST8-1) in the operating PCs as shown in the area (c) of FIG. 8, first, the digital data to be transmitted are generated (step ST8131) based on a previously set condition (the default value), and it is determined whether or not the data amount or the like of the digital data fall within the range of the available band information items read from the memory 240 (step ST8132). When it is determined in step ST8132 that the data amount or the like of the generated digital data do not fall within the range of the read available band information items, part of the generated data is extracted (step ST8133). When sorting out the data in step ST8133, for example, a frame is eliminated or part of the data configuring a scalability of JPEG 2000 is extracted. When, on the other hand, it is determined that the data amount or the like of the generated digital data fall within the range of the read available band information items, the digital data obtained in step ST8131 are transmitted to the counter PCs (step ST8-2).

Figure 9:
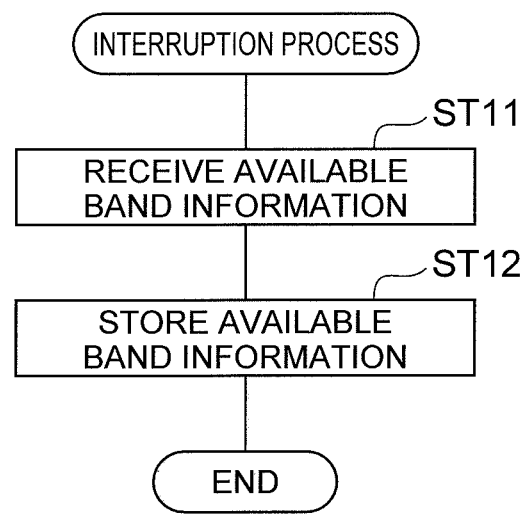
FIG. 9 is a flowchart for explaining an interruption process.

When the available band is allocated from the traffic control apparatus 100 to the operating PCs as described above (transmitting the available band information items from the traffic control apparatus 100 to the PCs 220B), the operating PCs perform the interruption process. As shown in FIG. 9, this interruption process is carried out by the controller 230 of each of the operating PCs. When the available band information items are received by each of the operating PCs (step ST11), the controller 230 stores the received available band information items into the memory 240. The interruption process is executed in this manner. Note that this writing operation for writing the available band information items into the memory 240 converts the available band information items stored in the memory 240. The operating PCs divide the data to be transmitted (see the flowcharts shown in FIGS. 7 and 8), which are generated based on the available band information items in the memory 240 that are converted by the interruption process, and transmit the divided data to the Internet 10, in a manner that the divided data are temporally arranged substantially evenly so as not to exceed the allocated bands.

The configuration described above can avoid a situation where the communication bands are occupied by some of the PCs that communicate data, and each of the PCs 220B belonging to the local network 200B to be monitored can transmit/receive data within the communication band allocated thereto, without being affected by the communication statuses of the other PCs. As a result, a significant decrease of the throughput of only some of the PCs can be avoided, and the communication performance of the entire local network 200B can be optimized.

Applied Example

Next, an applied example of the communication performance optimization operation performed by the traffic control apparatus 100 according to the present embodiment is described in detail with reference to FIG. 10. Note that, in a network configuration shown in FIG. 10, a plurality of local networks 200A, 200B, 200C are connected to the Internet 10 by representative nodes 211A, 211B, 211C, respectively. The traffic control apparatus 100 according to the present embodiment also is connected to the Internet 10. Note that the traffic control apparatus 100 may be any of the components configuring the local networks 200A, 200B, 200C.

Figure 10:
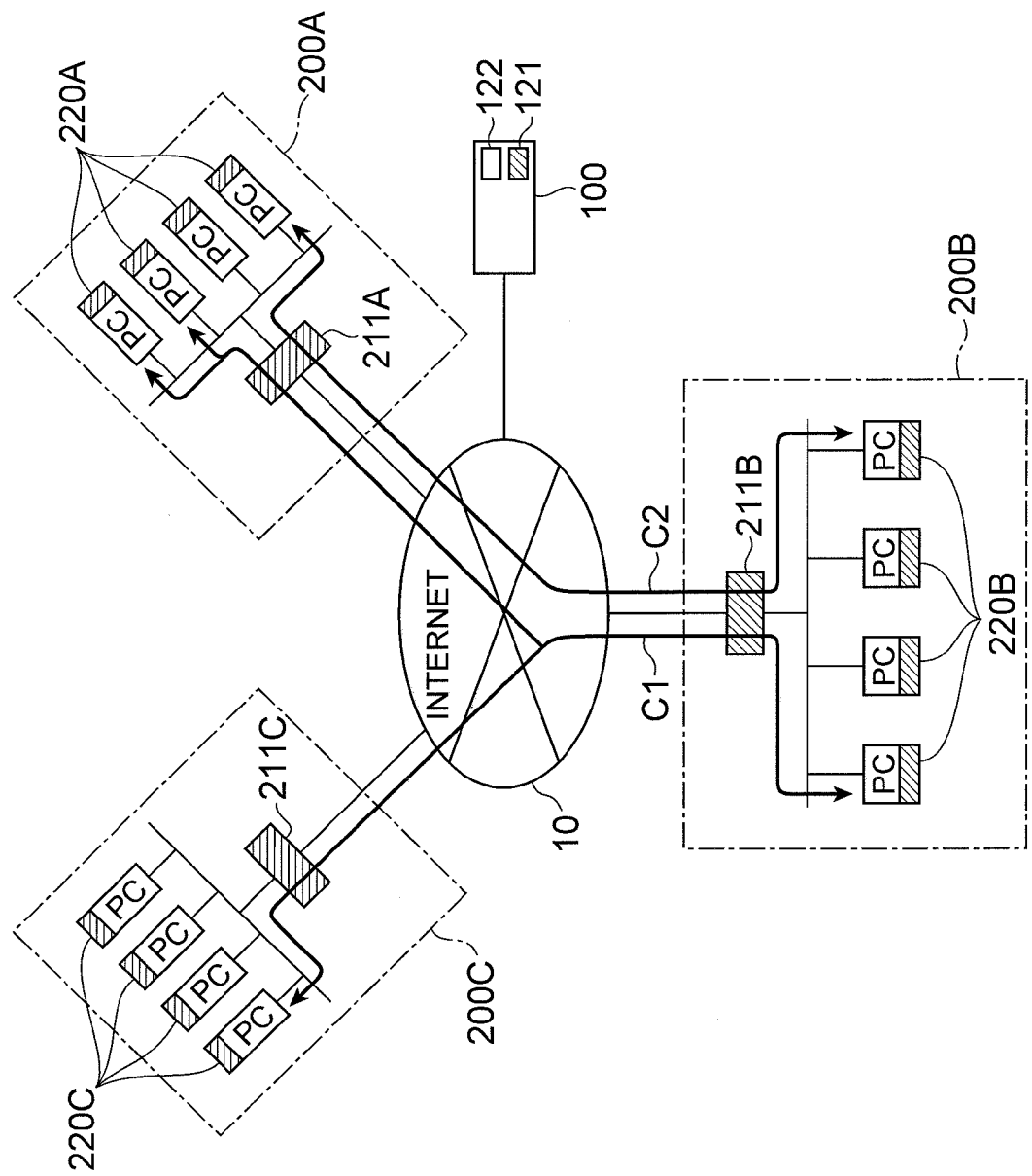
FIG. 10 is a view for explaining an applied example of the communication performance optimization operation performed by the traffic control apparatus according to the present embodiment.

FIG. 10 shows only the local networks 200A, 200B, 200C of the traffic control apparatus 100 of the present embodiment, which serve as monitoring candidates, but a number of local networks that are not monitored are also connected to the Internet 10. In each of the monitoring candidate local networks, a relay node is installed with a communication band monitoring application, with which communication band information items can be acquired by the traffic control apparatus 100. Furthermore, each of the PCs belonging to the monitoring candidate local networks is installed with a two-way data communication application that enables transmission/reception of digital data such as sound and images and that is capable of understanding the operation status of each PC through the traffic control apparatus 100. The traffic control apparatus 100 understands the PCs configuring an operating communication group, and thereby specifies a local network to which these PCs belong, as a local network to be monitored.

The local network 200A is configured by the representative node 211A (a plurality of relay nodes may be disposed in lower layers of the representative node 211A), and a plurality of PCs 220A disposed in the lower layers of the representative node 211A. The representative node 211A functions as a highest relay node for connecting the local network 200A and the Internet 10 to each other. Therefore, the local network 200A is configured in a manner that each of the PCs 220A belonging to the local network 200A can be connected to the Internet 10 only by the representative node 211A.

The local network 200B also is configured by the representative node 211B (a plurality of relay nodes may be disposed in lower layers of the representative node 211B), and a plurality of PCs 220B disposed in the lower layers of the representative node 211B. The representative node 211B functions as a highest relay node for connecting the local network 200B and the Internet 10 to each other. Therefore, the local network 200B is configured in a manner that each of the PCs 220B belonging to the local network 200B can be connected to the Internet 10 only by the representative node 211B.

Moreover, the local network 200C is configured by the representative node 211C (a plurality of relay nodes may be disposed in lower layers of the representative node 211C), and a plurality of PCs 220C disposed in the lower layers of the representative node 211C. The representative node 211C functions as a highest relay node for connecting the local network 200C and the Internet 10 to each other. Therefore, the local network 200C is configured in a manner that each of the PCs 220C belonging to the local network 200C can be connected to the Internet 10 only by the representative node 211C.

Note that the PCs 220A, 220B, 220C belonging to the local networks 200A, 200B, 200C also have the structure shown in FIG. 2. In each of the PCs 220A, 220B, 220C, the same two-way data communication application 241 is installed in the memory 240 so that the traffic control apparatus 100 can understand its operation status. The operation status of each of the PCs indicates whether or not the two-way data communication application 241 is executed by the controller 230. The traffic control apparatus 100 of the present embodiment that is connected to the Internet 10 also has the structure shown in FIG. 2, and the control means 110 executes the traffic control application 121.

More specifically, suppose that two-system communication (two-way data communication) is performed among the PCs belonging to each of the three local networks 200A, 200B, 200C, as shown in FIG. 10.

In this case, the traffic control apparatus 100 manages the local networks to which the operating PCs participating in each communication belong, in a dynamic management table 122B shown in FIG. 11, while referring to the static management table 122A stored in the memory 120. This dynamic management table 122B is also stored in the memory 120 of the traffic control apparatus 100. Then, the communication band information items are acquired sequentially as the traffic information items, from the relay nodes of the local networks to which the operating PCs belong.

For example, in the example shown in FIG. 10, a first communication C1 is performed by four PCs, and each of the local networks 200A, 200B, 200C to which the PCs belong is the network to be monitored in the first communication C1. On the other hand, another communication (second communication C2) is performed by two PCs, and each of the local networks 200A, 200B to which the PCs belong is the network to be monitored in the second communication C2.

The traffic control apparatus 100 monitors the local networks 200A, 200B, 200C to which the PCs (the operating PCs) performing the understood communications belong, as described above, and the communication band information items are acquired as the traffic information items, from the relay nodes of these local networks (the representative nodes 211A, 211B, 211C in the example shown in FIG. 10) via the I/O 140. The acquired communication band information items are stored sequentially in the memory 120.

Then, when any of the representative nodes 211A to 211C included in the local networks 200A to 200C to be monitored is specified as a bottleneck representative node, the traffic control apparatus 100 allocates the available bands that can be used for data transmission/reception, to the operating PCs participating in either the first communication C1 or the second communication C2 (the PCs executing the two-way data communication application 241), out of the PCs belonging to the local network having the bottleneck representative node. More specifically, as with the optimization operations shown in the area (b) of FIG. 5 and FIG. 6, the controller 110 calculates the available bands (data transmittable/receivable bands) to be notified to the operating PCs, based on the number of operating PCs and the communication band of the bottleneck representative node (the traffic information items stored in the memory 120). At this moment, the total value of the available bands to be notified to the operating PCs, which is the total value of the communication bands used in each communication, is set so as not to exceed the communication band of the bottleneck representative node. Then, information items on the calculated available bands are transmitted, via the I/O 140, to each of the operating PCs out of the PCs belonging to the local network having the bottleneck representative.

On the other hand, each of the operating PCs performs the digital data transmission/reception operation in accordance with the flowcharts shown in FIGS. 7 and 8, and each of the operating PCs that are notified of the available bands by the traffic control apparatus 100 performs the interruption process shown in FIG. 9. In other words, the operating PCs divide the data to be transmitted, which are generated based on the available band information items in the memory 240 that are converted in the interruption process, and then transmit the divided data to the counter PCs, in a manner that the divided data are temporally arranged substantially evenly so as not to exceed the allocated bands. The information items on the available bands are also transmitted to the counter PCs that communicate with the PCs having the specified bottleneck relay node. In other words, each of the counter PCs performs the digital data transmission/reception operation in accordance with the flowcharts shown in FIGS. 7 and 8, and each of the counter PCs that are notified of the available bands by the traffic control apparatus 100 performs the interruption process shown in FIG. 9. In other words, the counter PCs divide the data to be transmitted, which are generated based on the available band information items in the memory 240 that are converted in the interruption process, and then transmit the divided data to the operating PCs, in a manner that the divided data are temporally arranged substantially evenly so as not to exceed the allocated bands.

The configuration described above can avoid a situation where the communication bands are occupied by some of the PCs that communicate data, and each of the PCs 220B belonging to the local network 200B to be monitored can transmit/receive data within the communication band allocated thereto, without being affected by the communication statuses of the other PCs. As a result, a significant decrease of the throughput of only some of the PCs can be avoided, and the communication performance of the entire local network 200B can be optimized.

REFERENCE SIGNS LIST

10 . . . Internet (data communication network), 100 . . . traffic control apparatus, 200A, 200B, 200C . . . local network, 211A, 211B, 211C . . . representative node (highest relay node), 210A, 210B . . . relay node group, 212A, 213A, 212B, 213B . . . lower relay node, 22, 23, 130, 140, 270, 280 . . . I/O (input/output means), 21, 110, 230 . . . controller (control means), 24, 120, 240 . . . memory (recording means), 121 . . . traffic control application, 122 . . . management table, 122A . . . static management table, 122B . . . dynamic management table, 24A . . . communication band monitoring application, 241 . . . two-way data communication application

The invention claimed is:
1. A data communication system, comprising:
a data communication network enabling two-way data communication;
one or more local networks that are each configured by a plurality of information terminals and connected to the data communication network via a representative node; and
a traffic control apparatus, which sets, as a monitoring target network, a local network connected to the data communication network outside the local network via the representative node, and which is connected to the data communication network or arranged to configure a part of the local network,
wherein the traffic control apparatus comprises:
input/output means for transmitting/receiving data to/from one or more relay nodes that are disposed in an area between the plurality of information terminals and the representative node and include the representative node;
recording means for temporarily storing a communication band information item of each of the one or more relay nodes as a traffic information item of each of the one or more relay nodes; and
control means for specifying a bottleneck relay node from among the one or more relay nodes based on the communication band information items stored in the recording means, and calculating transmittable/receivable bands to be respectively allocated to operating information terminals out of the plurality of information terminals belonging to the local network, in a manner that a total value of the transmittable/receivable bands does not exceed a communication band of the specified relay node, and moreover notifying the operating information terminals, of the calculated transmittable/receivable bands, via the input/output means,
wherein each of the operating information terminals generates the data to be transmitted while adjusting data amount thereof based on the transmittable/receivable band allocated thereto, and
wherein, after adjustment of the data amount of the data to be transmitted, each of the operating information terminals divides the data to be transmitted which have the adjusted data amount, and transmits the divided data to the data communication network, in a manner that the divided data are temporally arranged substantially evenly so as not to exceed the allocated band.

2. The data communication system according to claim 1, wherein together with the local network that is set as the monitoring target network, one or more local networks, each of which is configured by a plurality of information terminals, are connected to the data communication network via a representative node,
wherein the traffic control apparatus resets, as additional local monitoring target networks, other local networks to which belong other information terminals that perform two-way data communication with the information terminals belonging to the local network set as a monitoring target network, in order to optimize a communication performance of each of the local networks connected to the data communication network,
wherein the input/output means transmits/receives data, in each of the two or more reset local networks set as monitoring target networks, to/from one or more relay nodes that are arranged in an area between the plurality of information terminals and the representative node and include the representative node,
wherein the recording means temporarily stores a communication band information item of each of the one or more relay nodes as a traffic information item of each of the one or more relay nodes, for each of the two or more reset local networks set as monitoring target networks, and wherein
wherein the control means specifies a local network that includes a bottleneck relay node from among the one or more relay nodes, as an optimization target local network, based on the communication band information items stored in the recording means, and calculates transmittable/receivable bands to be allocated to the operating information terminals out of the plurality of information terminals belonging to the local network set as an optimization target local network, in a manner that a total value of the transmittable/receivable bands does not exceed a communication band of the relay node of the specified local network, and then notifies the operating information terminals, of the calculated transmittable/receivable bands, via the input/output means.

3. The data communication system according to claim 1, wherein the recording means stores a static management table for managing at least address information items of the relay nodes of the local network set as a monitoring target local network, address information items of the information terminals belonging to the local network set as a monitoring target local network, and connection statuses of the information terminals of the local network set as a monitoring target local network.

4. The data communication system according to claim 2, wherein the recording means stores, for each of the two or more local networks set as monitoring target local networks, a static management table for managing at least address information items of the relay nodes, address information items of the information terminals belonging to the two or more local networks set as monitoring target local networks, and connection statuses of the information terminals.

5. The data communication system according to claim 2, wherein the recording means stores, for each two-way data communication, a dynamic management table for managing address information items of the information terminals performing the two-way data communication, and information items of the local networks to which the information terminals belong.

6. A data communication system, comprising:
a data communication network enabling two-way data communication;
one or more local networks that are each configured by a plurality of information terminals and connected to the data communication network via a representative node; and
a traffic control apparatus, which sets, as monitoring target networks, two or more local networks connected to the data communication network outside the local networks via the representative node, and optimizes a communication performance of each of the local networks connected to the data communication network,
wherein the traffic control apparatus is connected to the data communication network or arranged to configure a part of any of the plurality of the local networks, and comprises:
input/output means for transmitting/receiving, in each of the two or more local networks set as monitoring target local networks, data to/from one or more relay nodes that are arranged in an area between the plurality of information terminals and the representative node and include the representative node;
recording means for temporarily storing a communication band information item of each of the one or more relay nodes as a traffic information item of each of the one or more relay nodes, for each of the two or more local networks set as monitoring target local networks; and
control means for specifying a local network that includes a bottleneck relay node from among the one or more relay nodes, as an optimization target local network, based on the communication band information items stored in the recording means, and calculating transmittable/receivable bands to be allocated respectively to operating information terminals out of the plurality of information terminals belonging to the local network set as an optimization target local network, in a manner that a total value of the transmittable/receivable bands does not exceed a communication band of the relay node of the specified local network, and moreover notifying the operating information terminals out of the calculated transmittable/receivable bands, via the input/output means,
wherein each of the operating information terminals generates the data to be transmitted while adjusting data amount thereof based on the transmittable/receivable band allocated thereto, and
wherein, after adjustment of the data amount of the data to be transmitted, each of the operating information terminals divides the data to be transmitted which have the adjusted data amount, and transmits the divided data to the data communication network, in a manner that the divided data are temporally arranged substantially evenly so as not to exceed the allocated band.

7. The data communication system according to claim 6, wherein the recording means stores, for each of the two or more local networks set as monitoring target local networks, a static management table for managing at least address information items of the relay nodes, address information items of the information terminals belonging to the two or more local networks set as monitoring target local networks, and connection statuses of the information terminals.

8. The data communication system according to claim 6, wherein the recording means stores, for each two-way data communication, a dynamic management table for managing address information items of the information terminals performing the two-way data communication, and information items of the local networks to which the information terminals belong.

\* \* \* \* \*